US012361063B2

(12) United States Patent
Luu et al.

(10) Patent No.: US 12,361,063 B2
(45) Date of Patent: Jul. 15, 2025

(54) ANNOTATED INCIDENT RECREATION

(71) Applicant: AT&T Intellectual Property I, L.P., Atlanta, GA (US)

(72) Inventors: Adrianne Luu, Atlanta, GA (US); Robert Moton, Jr., Alpharetta, GA (US); Ryan Schaub, Berkeley Lake, GA (US); Timothy Knezevich, Mentor, OH (US); Barrett Kreiner, Woodstock, GA (US); Wei Wang, Harrison, NJ (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/931,389

(22) Filed: Sep. 12, 2022

(65) Prior Publication Data

US 2024/0086463 A1    Mar. 14, 2024

(51) Int. Cl.
*G06F 16/78*    (2019.01)
*G06V 20/40*    (2022.01)

(52) U.S. Cl.
CPC .......... *G06F 16/7867* (2019.01); *G06V 20/41* (2022.01); *G06V 20/46* (2022.01)

(58) Field of Classification Search
None
See application file for complete search history.

(56) References Cited

U.S. PATENT DOCUMENTS

| | | | | |
|---|---|---|---|---|
| 12,075,210 | B2* | 8/2024 | Lepoutre | G01S 3/805 |
| 2009/0143045 | A1* | 6/2009 | Graves | A61B 5/1113 |
| | | | | 455/404.1 |
| 2015/0312662 | A1* | 10/2015 | Kishimoto | H04R 1/08 |
| | | | | 381/92 |
| 2016/0061625 | A1* | 3/2016 | Wang | G01C 21/3697 |
| | | | | 701/454 |
| 2018/0299284 | A1* | 10/2018 | Wang | G08G 1/0112 |
| 2019/0278275 | A1* | 9/2019 | Song | H04L 67/12 |
| 2019/0347518 | A1* | 11/2019 | Shrestha | G06N 20/20 |
| 2020/0241552 | A1* | 7/2020 | Leenayongwut | H04R 3/005 |
| 2021/0291866 | A1* | 9/2021 | Smith | G06V 20/56 |
| 2021/0329376 | A1* | 10/2021 | Li | H04R 1/44 |
| 2022/0020230 | A1* | 1/2022 | Tal | G08G 1/0133 |

(Continued)

*Primary Examiner* — Daniel T Tekle
(74) *Attorney, Agent, or Firm* — Guntin & Gust, PLC; Mark Wilinski

(57) ABSTRACT

The disclosed technology is directed towards generating an annotated visual playback of an incident. Upon obtaining notification of an incident, event data occurring in the incident zone and timeframe are obtained (e.g., collected) from sensors proximate the zone. The event data is used to annotate a visual playback captured by one or more cameras, e.g., within a timeframe ranging from some time before the incident occurred to the end of the incident. For example, a video can be presented with overlaid annotation data, each annotation describing an event as it occurred in time, in conjunction with an advancing timestamp overlay showing the time of the video frames. A simulated video, e.g., extended reality video, can also be generated, along with annotations and timeframe data, such as if captured from camera(s) from one or more various different perspectives.

20 Claims, 16 Drawing Sheets

(56) References Cited

U.S. PATENT DOCUMENTS

| | | | | |
|---|---|---|---|---|
| 2022/0090927 A1* | 3/2022 | Shear | ............... | G01C 21/3492 |
| 2022/0408180 A1* | 12/2022 | Lepoutre | ............... | G01S 5/20 |
| 2023/0080319 A1* | 3/2023 | Zhang | ............... | G01C 21/3807 |
| | | | | 701/26 |

* cited by examiner

ANNOTATED INCIDENT RECREATION

TECHNICAL FIELD

The subject application relates to the collecting incident-related information, and related embodiments.

BACKGROUND

When an incident of interest such as a crime, emergency situation, or other type of event (e.g., minor accident) occurs, often there are many types of electronic devices that may have been present in an area related to the incident. Such devices can collect data that can help assist in analyzing the incident, such as to determine a cause or contributing factors.

For example, a traffic camera and a security camera may have captured video of an incident, which along with various other devices and sensors, can provide a better understanding of what occurred and when. However, it is difficult to gather a thorough set of data, such as events that occurred before, during or after the incident which may have contributed to the incident.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
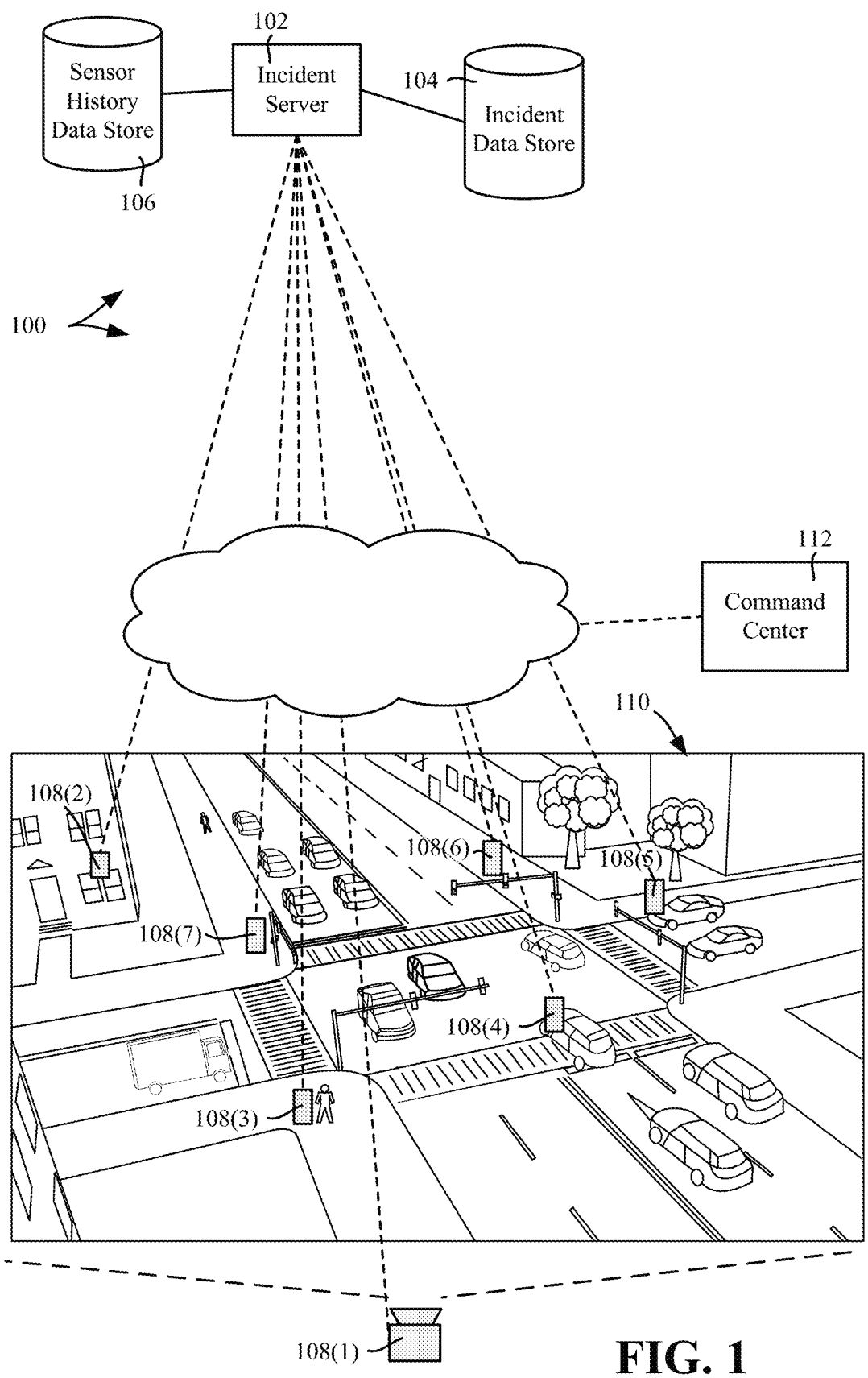
FIG. 1 is a block diagram of an example system and example representation of an area/zone related to an incident, in accordance with various aspects and embodiments of the subject disclosure.

The technology described herein is generally directed towards an annotated video that displays indications of events that are relevant, or potentially relevant, to the occurrence of an incident in a zone. Data describing the event(s) are captured by one or more sensors proximate the zone, in time and space.

As a result, when an incident of interest occurs, a thorough set of records of event(s) that occurred before, during, or after the incident that may have contributed to the incident are collected and analyzed. A visual re-creation of the incident is then able to be presented, which may include audio data, is augmented with event-based information so as to present visual re-creation an a meaningful way to assist in an analysis and understanding of the incident, such as to determine a cause or contributing factors. The visual re-creation can be actual video augmented (e.g., overlaid) with information such as event descriptions and the time of occurrence, and/or a simulated video, such as from the perspective of a witness to the incident, a witness, a participant involved in the incident, an entity such as a vehicle view, and/or an imaginary camera position.

This disclosure describes a solution to enable the production of an annotated video to display indications of events that are relevant, or potentially relevant to the occurrence of an incident. The embodiment presented is that of a traffic incident, but the solution presented may apply to other types of incidents as well. A problem exists in that, in the event of an incident of interest, it is difficult to gather a complete set of records of events that occurred either before, during, or after the incident that may have contributed to the incident. There are often many types of electronic devices that may have existed in an area related to the incident, but there does not exist a solution to enable the collection of data that may be relevant to the incident and to present it an a meaningful way so that the incident may be recreated, including the event data, to assist in an analysis of the incident, such as to determine a cause or contributing factors.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth. Olfactory output as well as taste output and/or tactile output can also be part of a promotional presentation as described herein.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows an example system 100 comprising an incident server 102 coupled to an incident data store (e.g., database) 104 and a sensor history data store (e.g., database) 106. In general, the incident server 102 accesses/maintains the incident data store 104 and in conjunction with the sensor history data store 106 to produce annotated presentations (e.g., augmented reality presentations) that recreate an incident.

As described herein and in general, the incident server 102 is configured to communicate with electronic devices, such as to receive data collected by sensors within an area. The incident server 102 can then analyze the data, and use the data to create one or more annotated re-creation of an incident, as described herein.

As shown in the example of FIG. 1, a number of sensing devices may exist within an area (which can be a three-dimensional space), such as at a traffic intersection. Seven such devices 108(1)-108(7) are shown in the example view 110 of FIG. 1 as gray blocks, however it is understood that this is a non-limiting example. Further, it is understood that the gray blocks are not intended to convey any size/scale, and only their approximate locations. Note that six of the sensors 108(2)-108(7) appear in the view 110, with the other sensor comprising a security (or other) camera A 108(1) that is obtaining the view 110 from an elevated position.

Such sensing devices may include, but are not limited to, personal smart devices such a smartphones (e.g., smart device A 108(3) and smart device B 108(4)), smart watches, and other, cameras such as dashboard cameras (e.g., the dashcam 108(6)), body cameras, and other cameras (e.g., security cameras, traffic cameras and so forth), and microphones. For example, the sensing device 108(2) can be a security camera B and microphone. Thus, although one or more devices can be stationary or mostly stationary (e.g., fixed cameras that are able to zoom, change viewing angle and so forth), the number devices present with respect to an incident can vary based on how many mobile devices are actively sensing data around the incident area within a given timeframe. Other sensing devices can include, but are not limited to, smart sensors, such as smart traffic signals (e.g., 108(6)), traffic lights, and/or other smart devices that may be pertinent for the specific type of area, such as a smart crosswalk signal (e.g., 108(7), although this may be part of the smart traffic signal (e.g., 108(6)). Also shown in FIG. 1 is a command center 112 as described herein.

Each sensing device may have one or more types of sensing capabilities, such as motion, video, audio, environmental sensing, and others. Each sensing device may have the ability to store data that the device senses locally, and may be equipped with the ability to interpret and act upon instructions using an incident application program, along with the ability to communicate over a network with the incident server 102, e.g., the as represented by the dashed lines. It is also feasible for a sensing device to communicate more indirectly with the incident server 102, for example to have its associated user upload collected data the incident server 102 when the user associated with a device recognizes that the device's collected data may be relevant.

In general, at least one camera (the camera 108(1) in the example of FIG. 1) exists that has the ability to record video of the area of the incident. This camera may also have LIDAR (Light Detection and Ranging) sensing capabilities, or other ability to create real-time three-dimensional representations of the area. This camera also is location aware, so that it understands its location in (x, y, z) space and the direction of its orientation and field of view. Because the camera 108(1) understands its location in space and understands the distance from itself to points within the camera's field of view, the camera 108(1) can determine the location in space of points and objects within its view. Dashboard cameras, autonomous car technology, other sensors like a camera, LIDAR, RADAR equipped on vehicles or the like can also generate significantly useful data, along with a main camera such as the camera 108(1) that may be providing a more comprehensive view.

Figure 2:
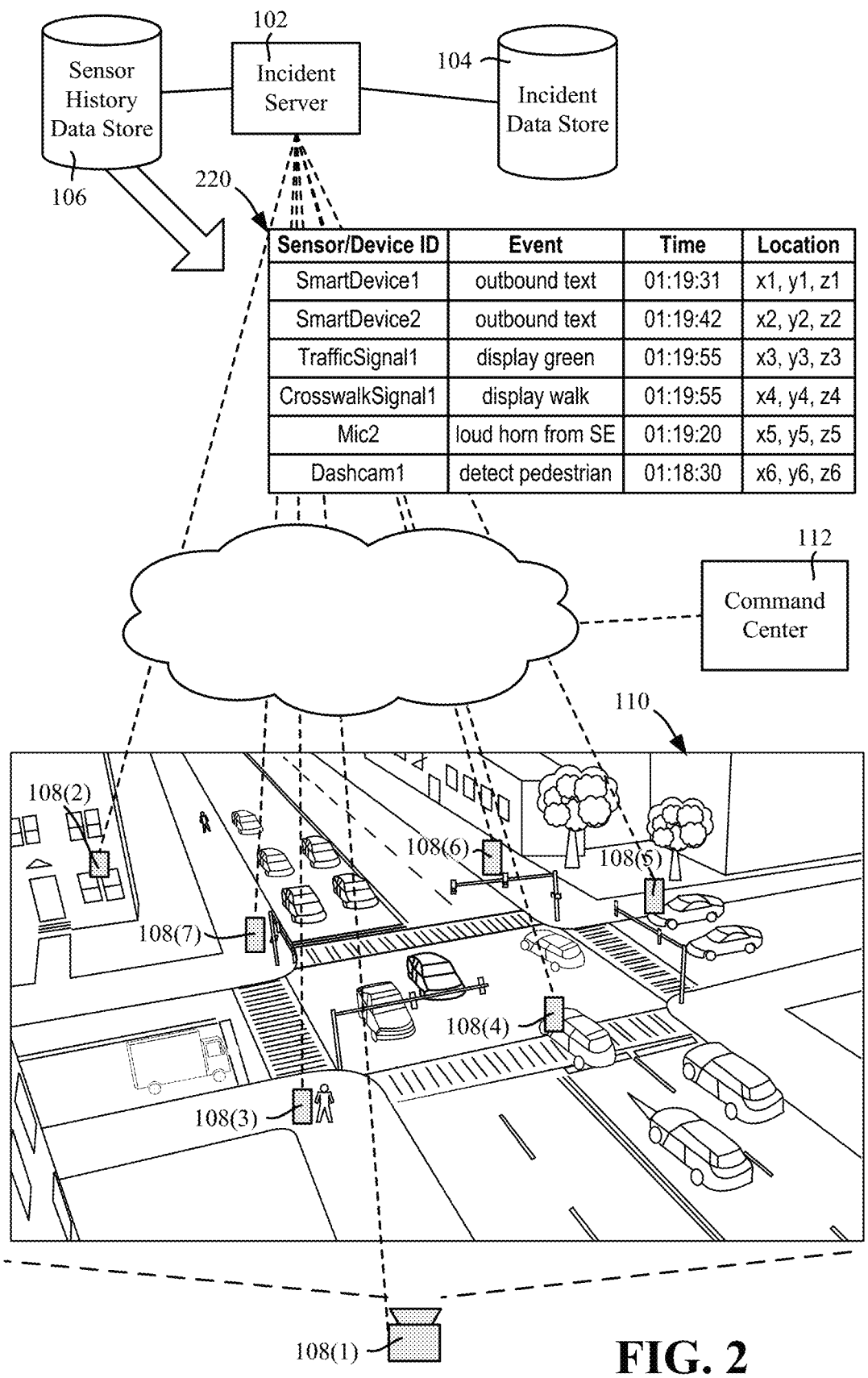
FIG. 2 is a block diagram of an example system and example sensor history data structure data related to an incident, in accordance with various aspects and embodiments of the subject disclosure.

Over time, the sensors 108(1)-108(7) that exist within the area record and timestamp data that represents their location and the occurrence of the events. This also may include events that the devices sense (such as sensing a motion, sensing a traveling speed of the device, and others) as well as events that the devices enact or detect (such as an action taken by an application program on the device, like sending a text message, receiving an incoming call, call in progress, taking a still photo, and others). Such events may be recorded in the sensor history data store 106 (e.g., as database records), as represented in FIG. 2 via the data structure 220, and/or may be stored locally on a device itself.

An incident of interest may be detected in a number of ways. For example, consider an incident in which a pedestrian has been struck by a vehicle. This may be detected by AI software analyzing video of any of the cameras in the area. It may also be detected by a device carried by the pedestrian or a sensor on the vehicle. Other devices in the area with sensing capabilities may likewise detect the incident or may send data they collect to the incident server for analysis and incident detection. The incident may also be directly reported via a call from someone nearby, an application program used to report incidents, and any other appropriate way. Note that while an example embodiment presented herein is that of a traffic incident, the technology described herein is applicable to many other types of incidents as well.

Figure 3:
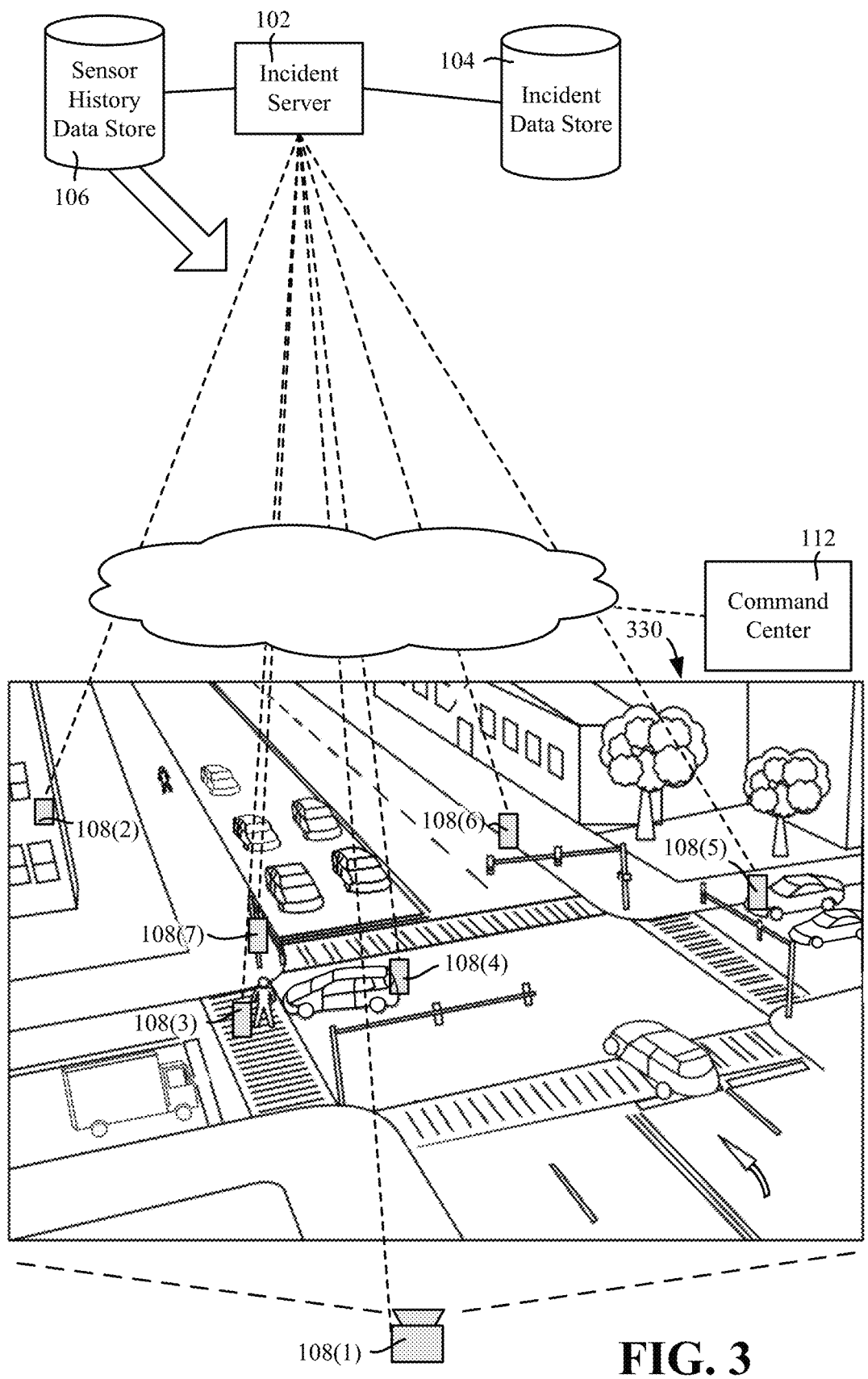
FIG. 3 is a block diagram of an example system and example representation of an area/zone in which an incident is occurring, in accordance with various aspects and embodiments of the subject disclosure.
Figure 4:
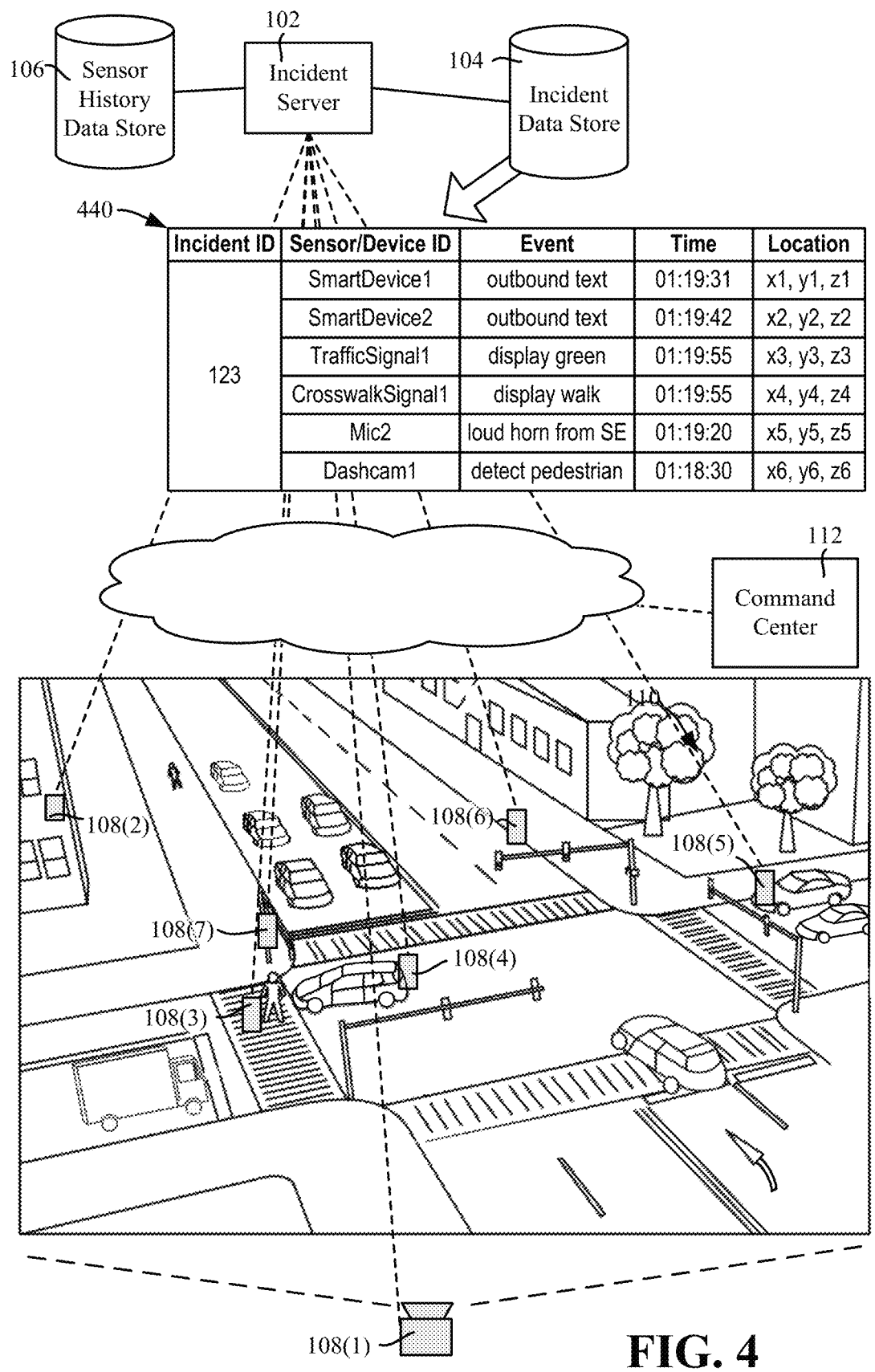
FIG. 4 is a block diagram of an example system and example incident data structure data related to an incident that has been detected, in accordance with various aspects and embodiments of the subject disclosure.

In any case, an incident record (or set of related records) 440, FIG. 4, may be created using event data from sensor devices that exist within or have a range within an area that is defined by the set of (x, y, z) points that make up the three dimensional area that exists within the field of view of the camera 108(1). This may include fixed location sensors within the area and also mobile sensors that have a transient location within the area for a period of time (timeframe) as defined for an incident duration. For example, in the later-in-time representation 330 of FIGS. 3 and 4, the sensors are capturing the state of events just as the vehicle (associated with device/sensor 108(4)) is about to strike the pedestrian (associated with device/sensor 108(3)). To assist with this, the incident duration may be a period of time that includes times before and after the occurrence of the incident. By way of example, if the incident is detected at time 01:20:30, the incident timeframe may be defined as 01:19:00-01:21:00, or similar. The type of incident may be used to determine the incident duration. For example, a two-car accident may be on the order of a couple of minutes, whereas a building fire may be on the order of an hour, and so on.

Because the (x, y, z) points in space of the area are known and the incident duration is known, data may be retrieved from the sensor history data store 106 and/or from any devices themselves or from other data stores' data that match the time and location of the incident. As previously shown with reference to FIG. 2, the sensor history data store 106 may include a collection of event-related data in the data structure (e.g., of sensor records) 220. That is, any events that were sensed within the area or within range of the area may be retrieved and added to the incident data structure (record set) 440, including their respective timestamps and location data, e.g., x, y, z coordinates in real world space. Polling may be used in the retrieval, e.g., of devices proximate the incident zone in the relevant timeframe, and/or event data pushed to the system 100. Artificial intelligence and/or human review and filtering of event data may be performed to ensure that any retrieved data is reliable and relevant.

Figure 5:
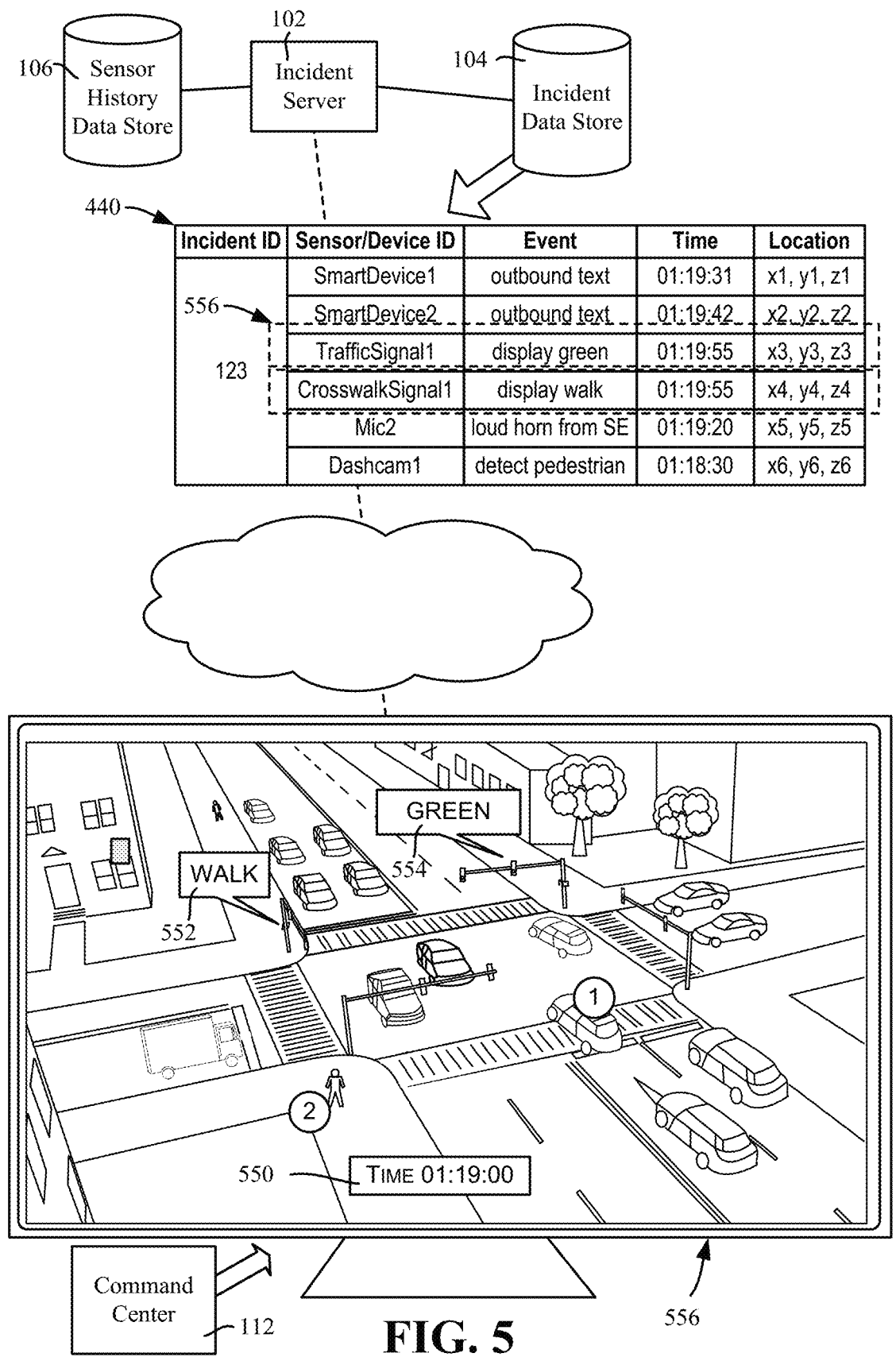
FIGS. 5-9 are block diagram of an example system and example representations over time of annotated re-crated presentations of an incident, in accordance with various aspects and embodiments of the subject disclosure.

Turning to the concept of annotated incident video, the incident server 102 may use the source video from the camera 108(1) (or other camera(s)) along with the event data in the incident record 440 to re-create the incident using an annotated video, such as augmented with overlaid text, in one embodiment. The video playback, such as shown in FIGS. 5-9, may include timestamps (e.g., advancing in time) in overlay portion 550 or the like, along with the annotations, e.g., the text overlays 552 and 554 in FIG. 5. This event data corresponds to the dashed blocks 556 in the incident data structure 440 in FIG. 5, showing the states of the traffic signal (green) and crosswalk signal (walk) at this time. The event annotations can be placed in locations as overlays in locations on the video presentation according to the event locations, as recorded. Note that the camera view can be analyzed (e.g., by a person or artificial intelligence) to determine "green" and "walk" states/events instead of or in addition to (e.g., to confirm proper functioning of) a smart traffic signal/crosswalk signal. In one embodiment, the annotated video may be presented for display to a display device 556, such as at the command center 112. The annotated video may be presented other scenarios, e.g., as evidence in a trial, at an insurance company review of the incident, and so on.

The annotated video playback may therefore present a story of the sequence of detected events that are pertinent to the incident. For this example, the car (circled numeral one (1)) will strike the pedestrian (circled numeral two (2)). At time 01:19:00 as represented in FIG. 5, the walk signal and green signal overlays 552 and 554, respectively, are presented. They can remain as part of the presentation until a canceling event occurs, which can be a timed expiration.

Figure 6:
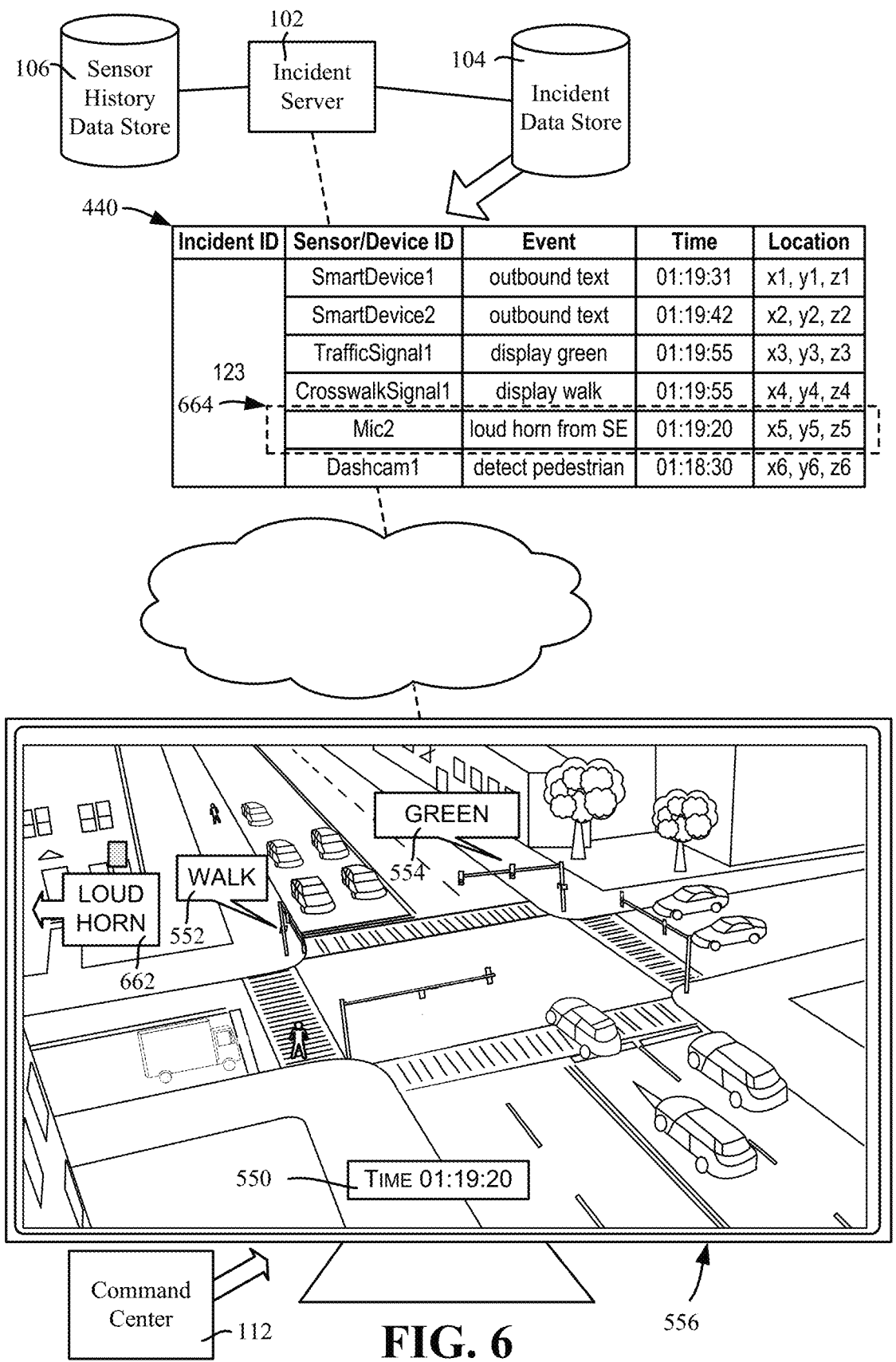

As shown in the example of FIG. 6, at time 01:19:20, the video advances (or has advanced) and the loud horn detection event is presented via an annotation 662 at the approximate location (or direction if outside the video frame, e.g., as depicted by the arrow as part of the annotation 662) of the microphone. An audio presentation of the horn (as well as anything else sensed by the microphone) may be output in conjunction with the playback. This event data corresponds to the dashed block 664 in the incident data structure 440 in FIG. 6, showing the "loud horn from SE" (southeast) microphone-detected event. If available, multiple microphones and their location data can be used to more accurately pinpoint the sound source rather than (or in addition to) the microphone detection location(s). Note that at the time depicted in FIG. 6, the pedestrian has now entered the crosswalk.

Figure 7:
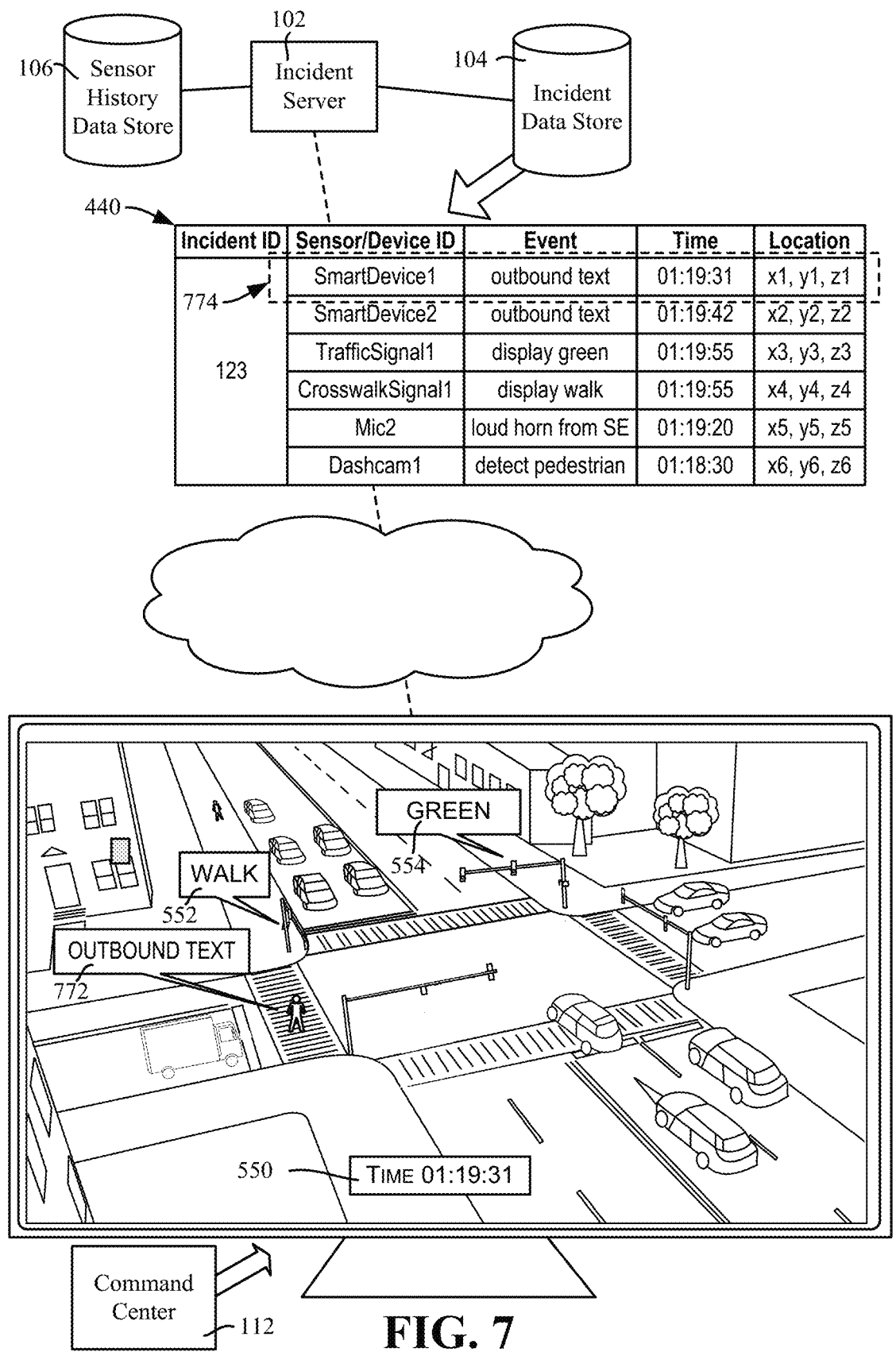

At time 01:19:31 as depicted in FIG. 7, the video advances and the loud horn detection overlay is removed due to the lack of continued detection. An outbound text event is detected from the pedestrian's device, so an event annotation 772 is displayed. This event data corresponds to the dashed block 774 in the incident data structure 440 in FIG. 7.

Figure 8:
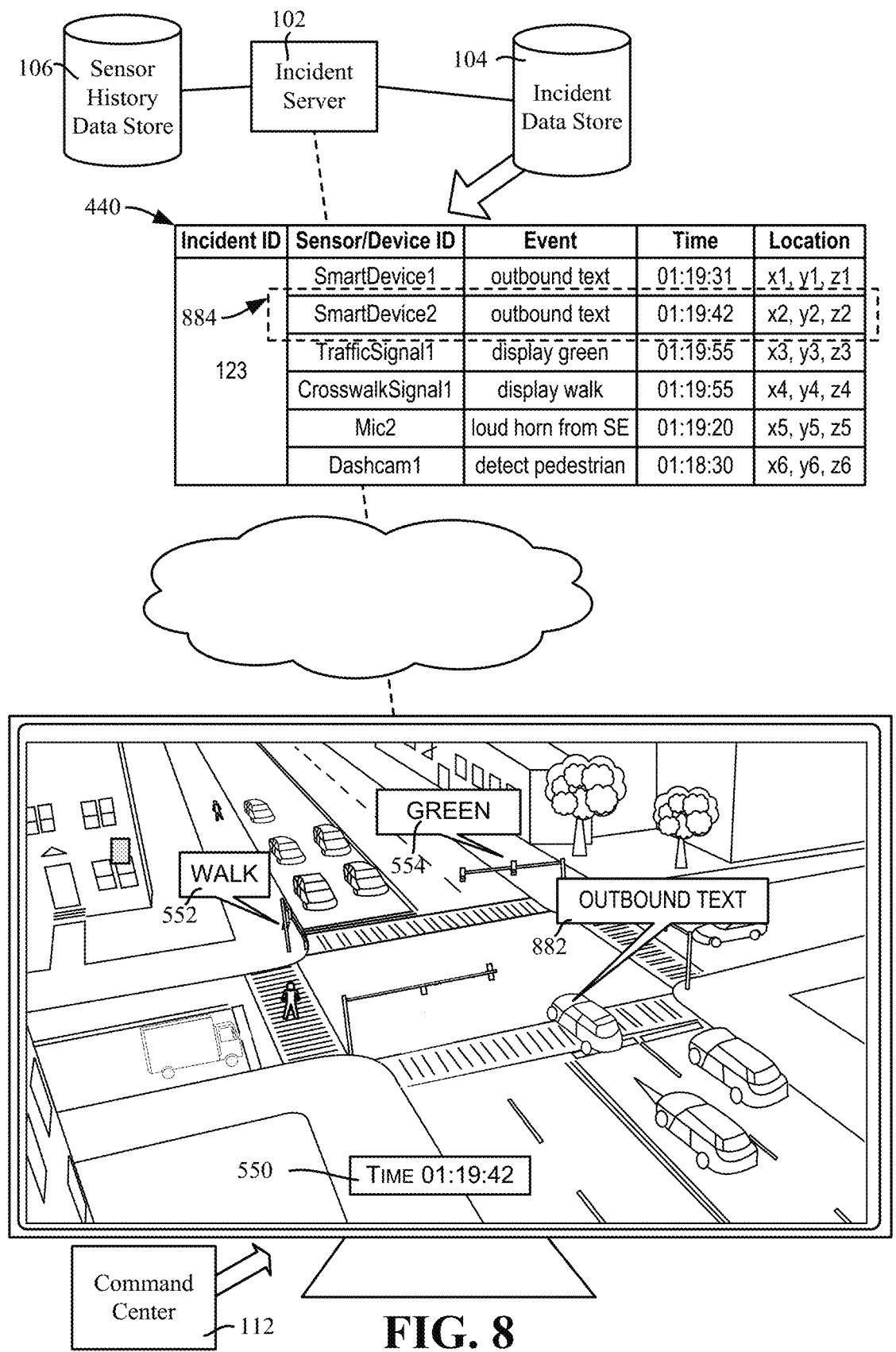

At time 01:19:42, the video advances as depicted in FIG. 8. An outbound text is detected from the driver's device at this time, so an event annotation 882 is displayed. This event data corresponds to the dashed block 884 in the incident data structure 440 in FIG. 8.

Figure 9:
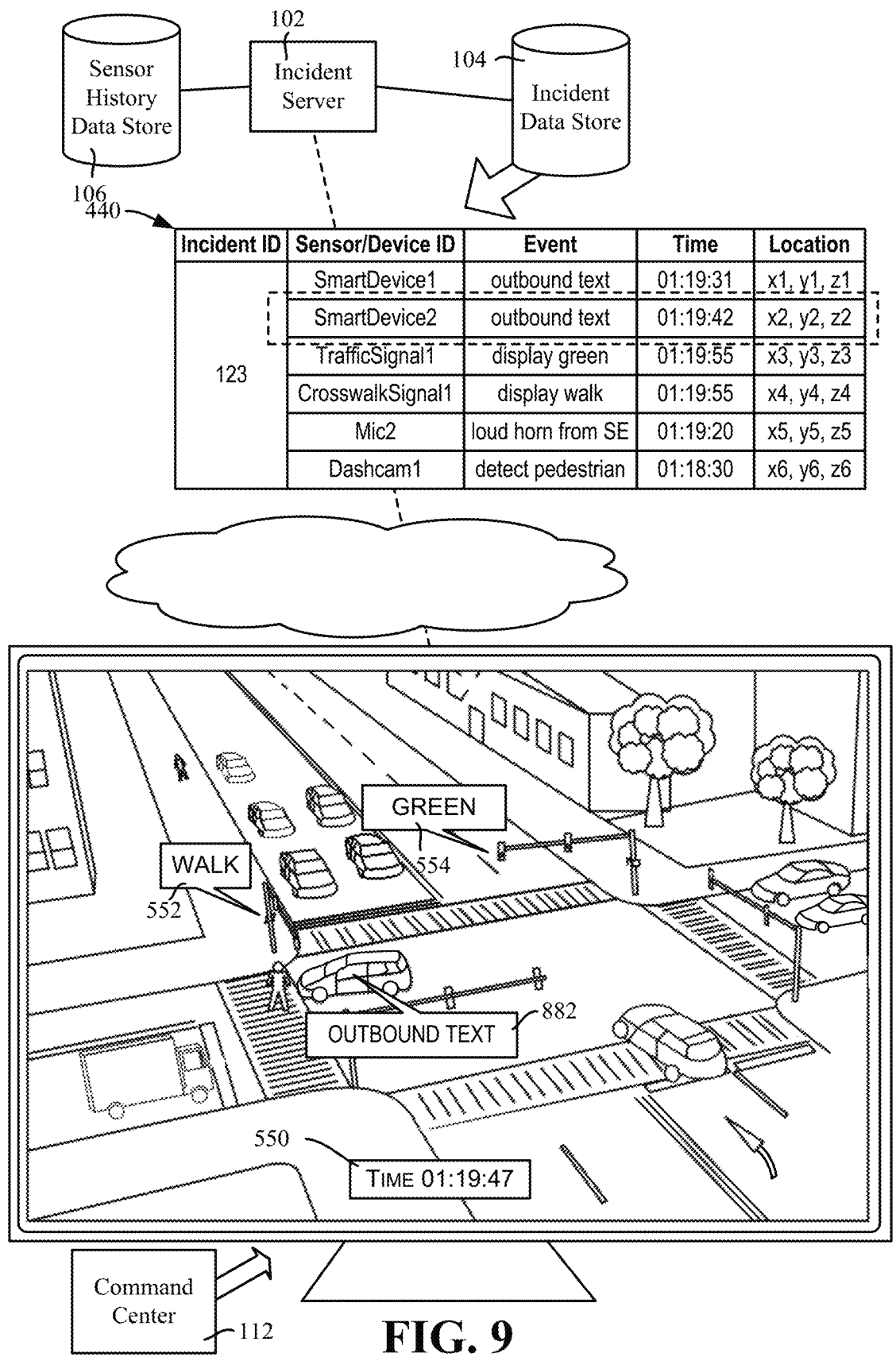

At time 01:19:47, the video advances as depicted in FIG. 9, showing the vehicle about to strike the pedestrian. The outbound text detected from the driver's device as represented by the annotation 882 has moved by this time and is displayed with the vehicle's position.

Figure 10:
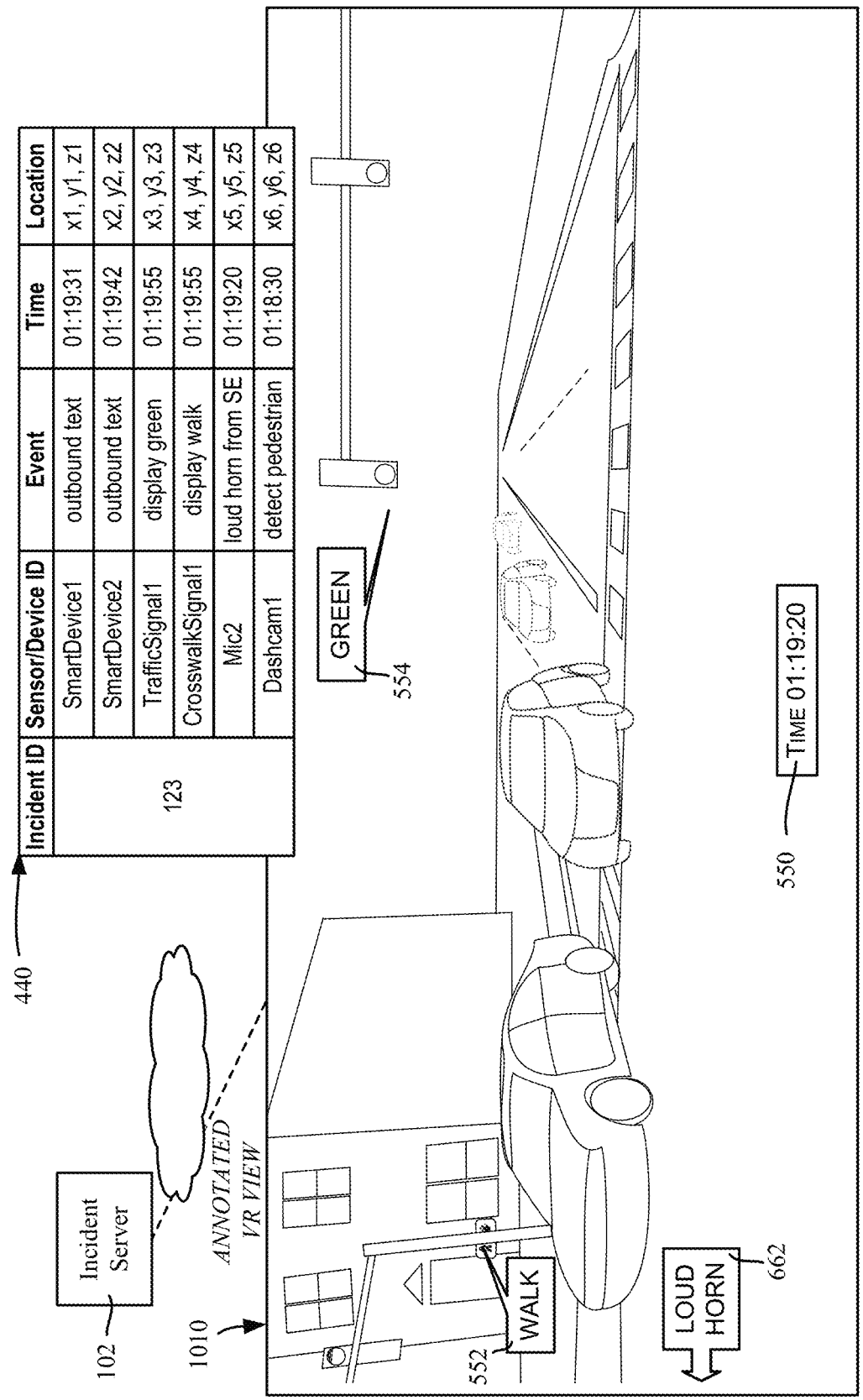
FIG. 10 is an example representation of a simulated recreation of an incident from a near-ground level perspective, in accordance with various aspects and embodiments of the subject disclosure.
Figure 11:
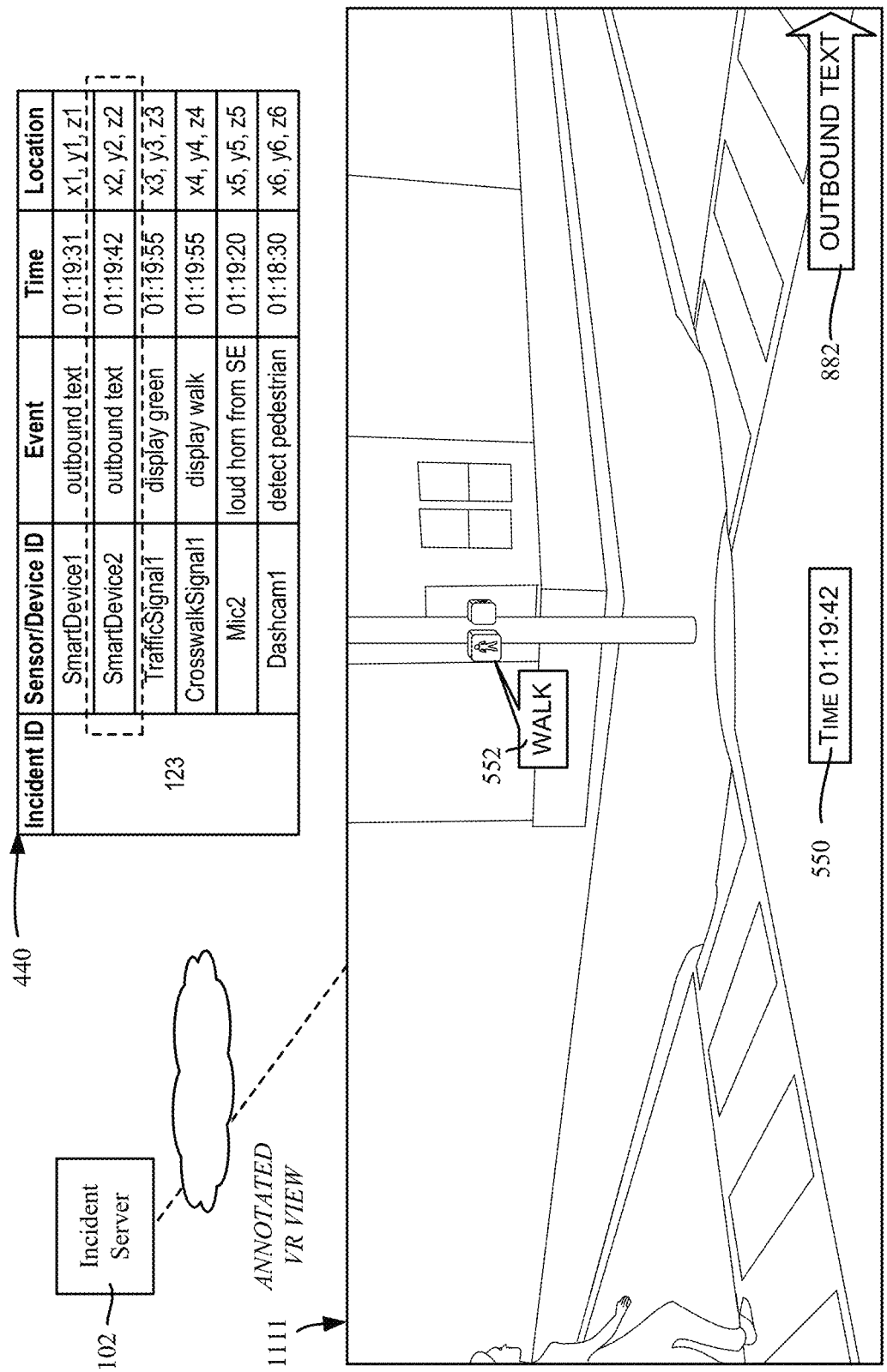
FIG. 11 is an example representation of a simulated recreation of an incident from another near-ground level perspective, in accordance with various aspects and embodiments of the subject disclosure.

In another embodiment, the playback may be represented as a virtual reality simulation that may be constructed based on data from one or more cameras available in the area. Alternatively, this may be presented as an augmented reality view, such as if, for example, an investigator is at the location or is reviewing the incident. This may, for example, permit the investigator to observe the re-creation of the events of the incident from the perspective of the driver, the pedestrian, a witness and/or an imaginary camera (e.g., as if positioned at a certain location), such as represented by the views 1010 of FIG. 10 and 1111 of FIG. 11. The same annotated events may be presented, such as shown in FIG. 10. Regardless of the perspective or real versus simulated playback, the playback may advance over time as described herein.

Figure 12:
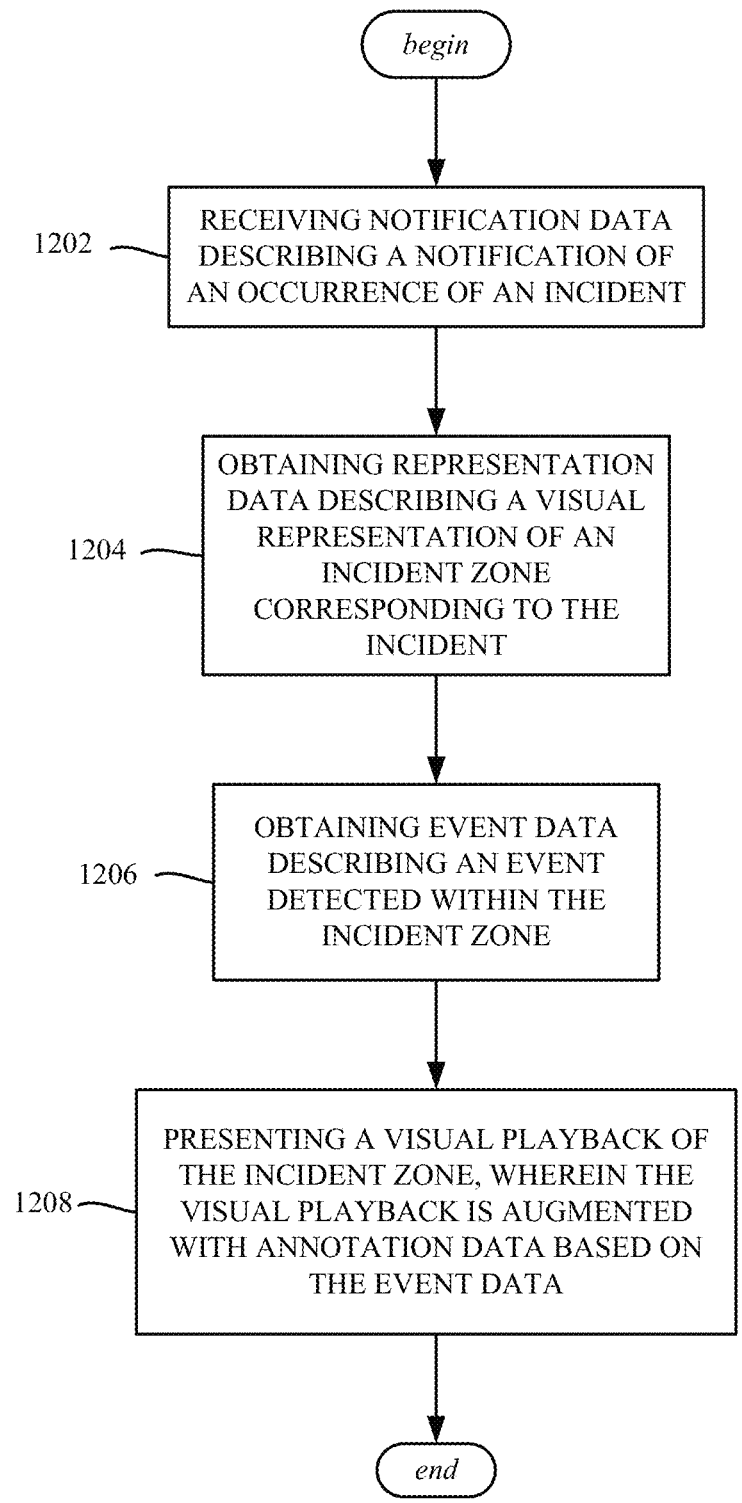
FIG. 12 is a flow diagram representing example operations related to presenting a visual playback of an incident zone, augmented with annotation data based on the event data, in accordance with various aspects and embodiments of the subject disclosure.

One or more example aspects are represented in FIG. 12, and can correspond to a system, including a processor, and a memory that stores executable instructions that, when executed by the processor, facilitate performance of operations. Example operation 1202 represents receiving notification data describing a notification of an occurrence of an incident. Example operation 1204 represents obtaining representation data describing a visual representation of an incident zone corresponding to the incident. Example operation 1206 represents obtaining event data describing an event detected within the incident zone. Example operation 1208 represents presenting a visual playback of the incident zone, wherein the visual playback is augmented with annotation data based on the event data.

Receiving the notification data can include obtaining the notification data via at least one of: a device comprising a sensor, an application program, or a human-initiated report.

The event data can include at least one of: device presence data describing respective presences of any devices with respect to the incident, device-human interaction data describing presence of any interaction between any devices and any humans with respect to the incident, environmental sensor data describing any environmental measurements made by any environmental sensors with respect to an environment applicable to the incident, traffic signal data describing any traffic signaling made by a traffic signal with respect to the incident, traffic light data describing any traffic light signals output by any traffic lights with respect to the incident, vehicle sensor data describing any vehicular measurements made by any vehicle sensors with respect to any vehicles in the environment applicable to the incident, wearable sensor data describing any wearable device measurements made by any wearable device sensors with respect to the incident, or portable sensor data describing any portable sensor measurements made by any portable sensors with respect to the incident.

Presenting the visual playback can include overlaying the annotation data over the visual playback as part of the visual playback. The annotation data can be correlated with timestamp data, and overlaying of the annotation data over the visual playback can be based at least in part on the timestamp data.

The event data can be associated with an event timeframe applicable to the event, the overlaying of the annotation data can include outputting an annotation describing the event based on a start of the event timeframe, and further operations can include detecting an end of the event timeframe, and, in response to the detecting of the end of the event timeframe, discontinuing the outputting of the annotation.

The annotation data can include a first visible representation corresponding to a first event, which can be a first part of the event, that is proximate a first location in the zone, and a second visible representation corresponding to a second event, which can be a second part of the event, that is proximate a second location in the zone, and presenting the visual playback can include overlaying the first visible representation at the first location within a scene depicted in the visual playback, and overlaying the second visible representation at the second location within the scene depicted in the visual playback.

Further operations can include detecting an end of the event, and, in response to the detecting of the end of the event, discontinuing a presentation of the annotation data as part of the presenting.

Presenting the visual playback can include outputting, to a virtual reality viewing device, information describing at least part of the visual playback.

The visual playback can include actual video data that is received from and was captured by a video sensor device during a timeframe corresponding to the incident.

The visual playback can include simulated video data recreating the incident during a timeframe corresponding to the incident.

The visual playback can include simulated video data recreating the incident from an extended reality viewing perspective.

Further operations can include outputting instructional data to a device as part of the obtaining of the representation data describing the visual representation of the incident zone.

Figure 13:
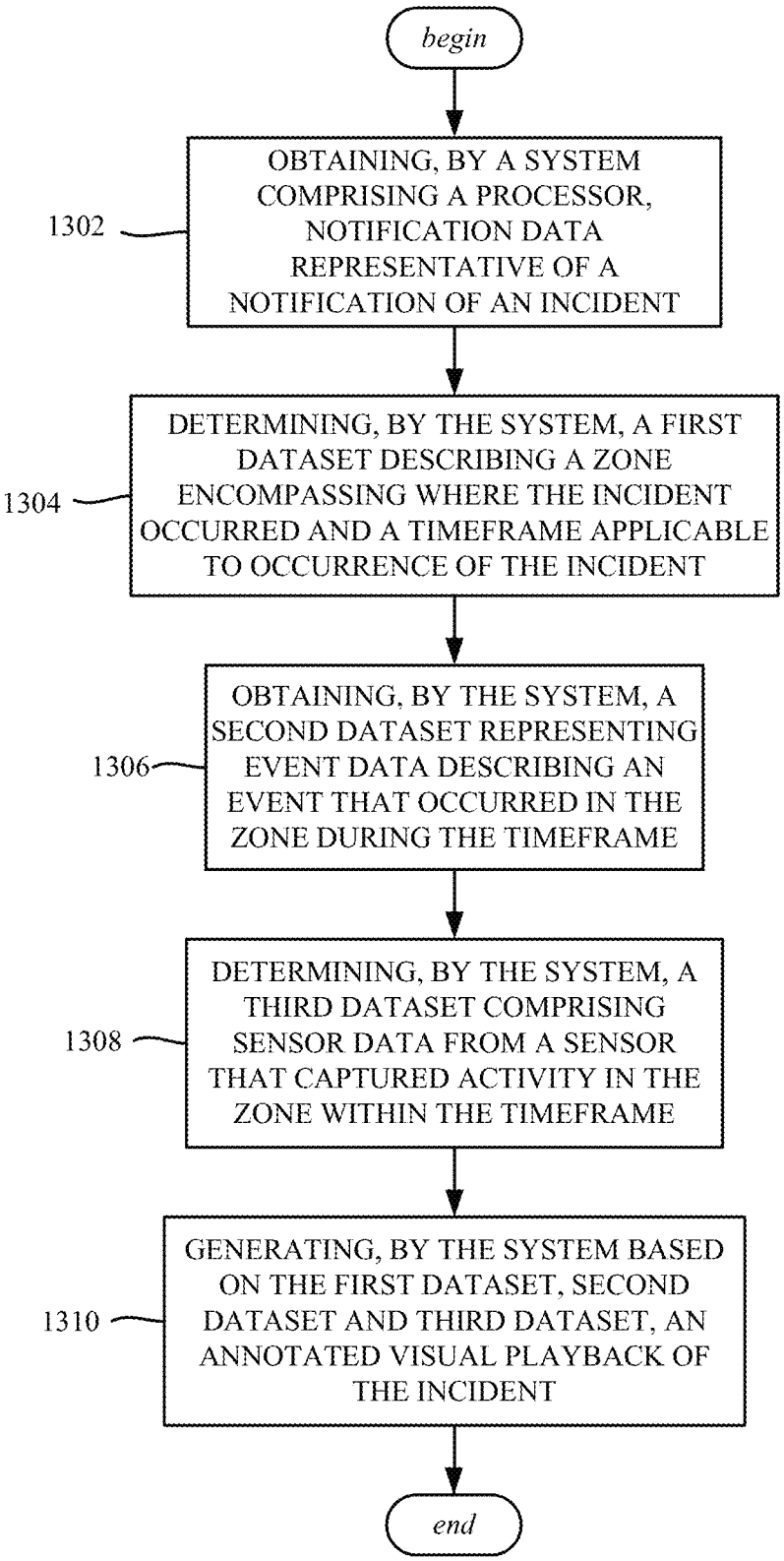
FIG. 13 is a flow diagram representing example operations related to generating an annotated visual playback of an incident based on various datasets, in accordance with various aspects and embodiments of the subject disclosure.

One or more example aspects are represented in FIG. 13, and, for example, can correspond to operations, such as of a method. Example operation 1302 represents obtaining, by a system comprising a processor, notification data representative of a notification of an incident. Example operation 1304 represents determining, by the system, a first dataset describing a zone encompassing where the incident occurred and a timeframe applicable to occurrence of the incident. Example operation 1306 represents obtaining, by the system, a second dataset representing event data describing an event that occurred in the zone during the timeframe. Example operation 1308 represents determining, by the system, a third dataset comprising sensor data from a sensor that captured activity in the zone within the timeframe. Example operation 1310 represents generating, by the system based on the first dataset, second dataset and third dataset, an annotated visual playback of the incident.

Generating the annotated visual playback of the incident can include generating a three-dimensional video simulation of a scene from a viewing perspective corresponding to a camera sensor identified in the third dataset, and annotating the three-dimensional video simulation based on the event data in the second dataset. Annotating the three-dimensional video simulation based on the event data in the second dataset can include determining a location in the scene corresponding to the event identified in the event data, and overlaying annotation data representing the event based on the location.

Generating the annotated visual playback of the incident can include generating an augmented reality presentation from a simulated viewing perspective; further operations can include outputting the augmented reality presentation to be rendered by an augmented reality viewing device.

Figure 14:
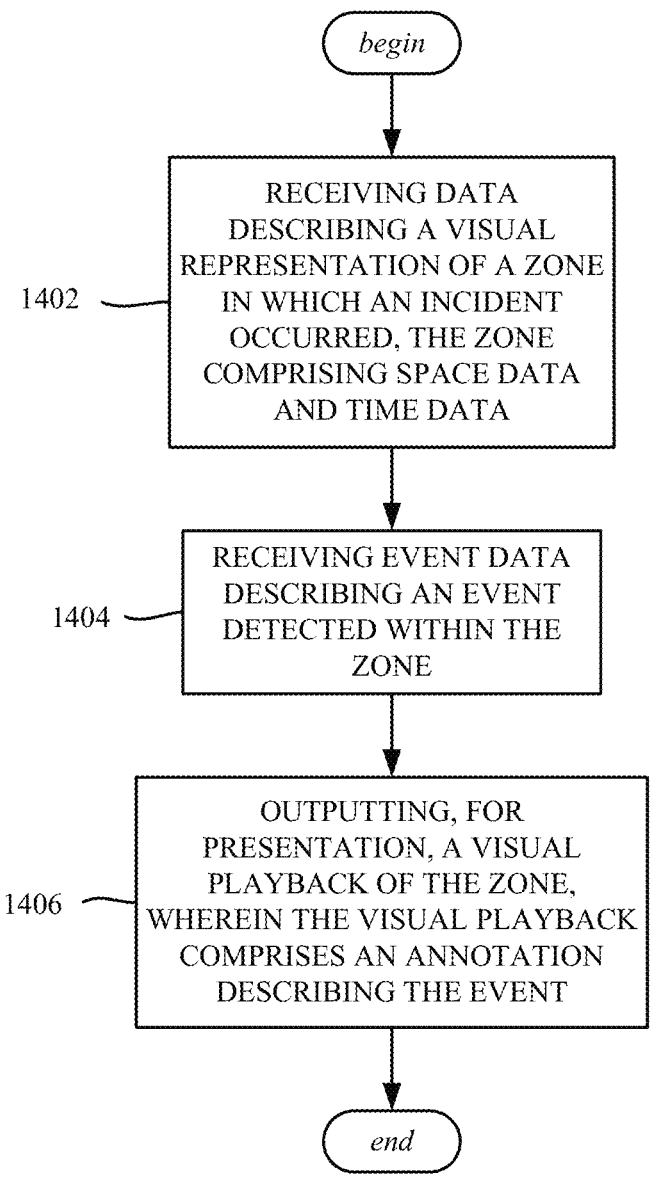
FIG. 14 is a flow diagram representing example operations related outputting a visual playback of an incident zone for presentation, including an annotation describing an event, in accordance with various aspects and embodiments of the subject disclosure.

One or more aspects are represented in FIG. 14, such as implemented in a machine-readable medium, including executable instructions that, when executed by a processor, facilitate performance of operations. Example operation 1402 represents receiving data describing a visual representation of a zone in which an incident occurred, the zone comprising space data and time data. Example operation 1404 represents receiving event data describing an event detected within the zone. Example operation 1406 represents outputting, for presentation, a visual playback of the zone, wherein the visual playback comprises an annotation describing the event.

The event can be associated with a location within the zone, and outputting the visual playback of the zone can include displaying the annotation based on the location.

The event can be associated with an ending time, and outputting the visual playback of the zone can include discontinuing presentation of the annotation based on the event ending time being reached in the visual playback.

As can be seen, the technology described herein facilitates an efficient way to gather a set of records of events that may have contributed to an incident, in which the events may have occurred before, during, or after the incident. The events that are relevant to the incident can be presented in a meaningful way, so that the incident may be re-created, including with annotated event data, to assist in an analysis and understanding of the incident.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 15:
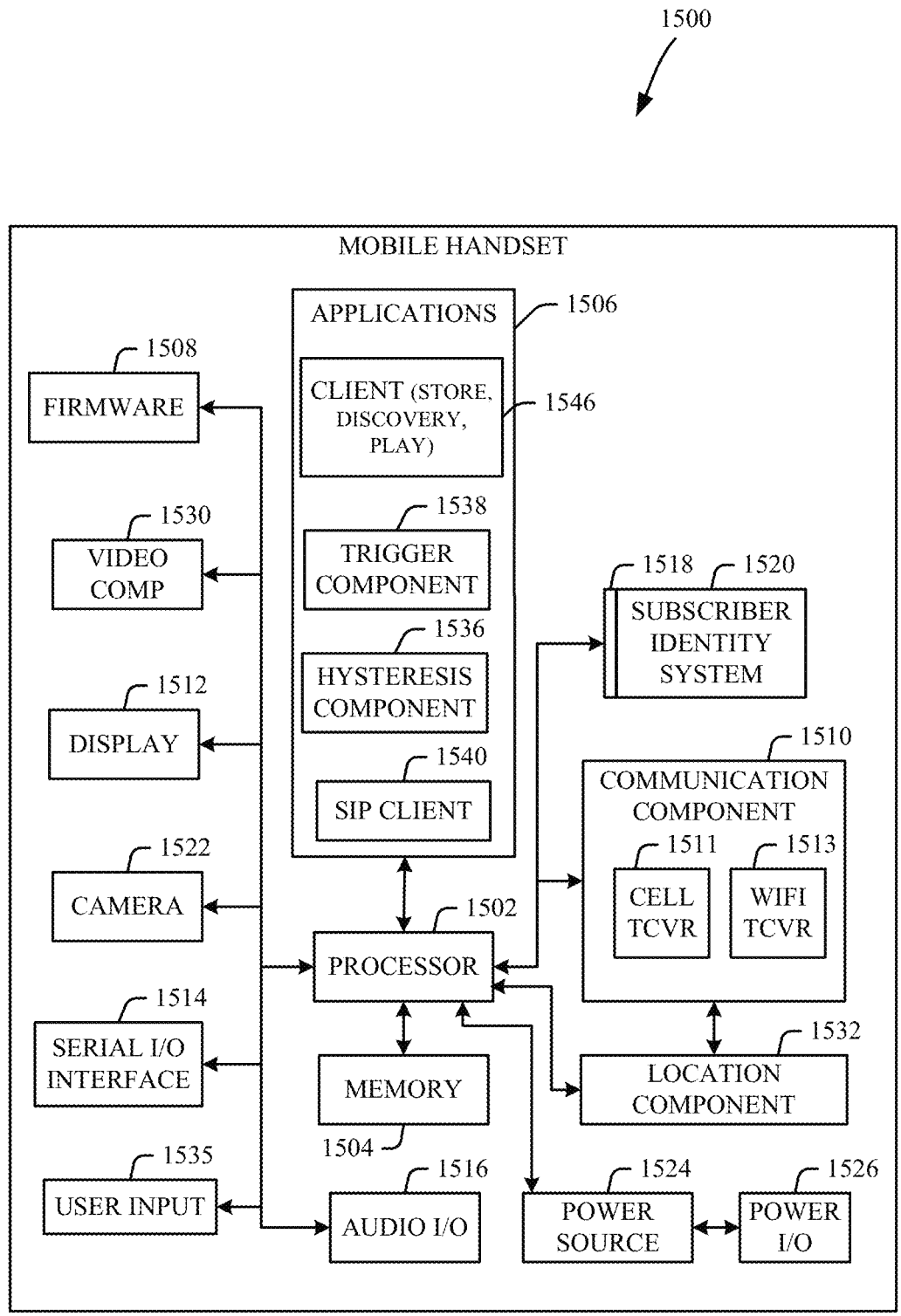
FIG. 15 illustrates an example block diagram of an example mobile handset operable to engage in a system architecture that facilitates wireless communications according to one or more embodiments described herein.

Referring now to FIG. 15, illustrated is a schematic block diagram of an example end-user device (such as user equipment) that can be a mobile device 1500 capable of connecting to a network in accordance with some embodiments described herein. Although a mobile handset 1500 is illustrated herein, it will be understood that other devices can be a mobile device, and that the mobile handset 1500 is merely illustrated to provide context for the embodiments of the various embodiments described herein. The following discussion is intended to provide a brief, general description of an example of a suitable environment 1500 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1500 includes a processor 1502 for controlling and processing all onboard operations and functions. A memory 1504 interfaces to the processor 1502 for storage of data and one or more applications 1506 (e.g., a video player software, user feedback component software, etc.). Other applications can include voice recognition of predetermined voice commands that facilitate initiation of the user feedback signals. The applications 1506 can be stored in the memory 1504 and/or in a firmware 1508, and executed by the processor 1502 from either or both the memory 1504 or/and the firmware 1508. The firmware 1508 can also store startup code for execution in initializing the handset 1500. A communications component 1510 interfaces to the processor 1502 to facilitate wired/wireless communication with external systems, e.g., cellular networks, VoIP networks, and so on. Here, the communications component 1510 can also include a suitable cellular transceiver 1511 (e.g., a GSM transceiver) and/or an unlicensed transceiver 1513 (e.g., Wi-Fi, WiMax) for corresponding signal communications. The handset 1500 can be a device such as a cellular telephone, a PDA with mobile communications capabilities, and messaging-centric devices. The communications component 1510 also facilitates communications reception from terrestrial radio networks (e.g., broadcast), digital satellite radio networks, and Internet-based radio services networks.

The handset 1500 includes a display 1512 for displaying text, images, video, telephony functions (e.g., a Caller ID function), setup functions, and for user input. For example, the display 1512 can also be referred to as a "screen" that can accommodate the presentation of multimedia content (e.g., music metadata, messages, wallpaper, graphics, etc.). The display 1512 can also display videos and can facilitate the generation, editing and sharing of video quotes. A serial I/O interface 1514 is provided in communication with the processor 1502 to facilitate wired and/or wireless serial communications (e.g., USB, and/or IEEE 1594) through a hardwire connection, and other serial input devices (e.g., a keyboard, keypad, and mouse). This supports updating and troubleshooting the handset 1500, for example. Audio capabilities are provided with an audio I/O component 1516, which can include a speaker for the output of audio signals related to, for example, indication that the user pressed the proper key or key combination to initiate the user feedback signal. The audio I/O component 1516 also facilitates the input of audio signals through a microphone to record data and/or telephony voice data, and for inputting voice signals for telephone conversations.

The handset 1500 can include a slot interface 1518 for accommodating a SIC (Subscriber Identity Component) in the form factor of a card Subscriber Identity Module (SIM) or universal SIM 1520, and interfacing the SIM card 1520 with the processor 1502. However, it is to be appreciated that the SIM card 1520 can be manufactured into the handset 1500, and updated by downloading data and software.

The handset 1500 can process IP data traffic through the communication component 1510 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1522 (e.g., a camera) can be provided for decoding encoded multimedia content. The video processing component 1522 can aid in facilitating the generation, editing and sharing of video quotes. The handset 1500 also includes a power source 1524 in the form of batteries and/or an AC power subsystem, which power source 1524 can interface to an external power system or charging equipment (not shown) by a power I/O component 1526.

The handset 1500 can also include a video component 1530 for processing video content received and, for recording and transmitting video content. For example, the video component 1530 can facilitate the generation, editing and sharing of video quotes. A location tracking component 1532 facilitates geographically locating the handset 1500. As described hereinabove, this can occur when the user initiates the feedback signal automatically or manually. A user input component 1534 facilitates the user initiating the quality feedback signal. The user input component 1534 can also facilitate the generation, editing and sharing of video quotes. The user input component 1534 can include such conventional input device technologies such as a keypad, keyboard, mouse, stylus pen, and/or touch screen, for example.

Referring again to the applications 1506, a hysteresis component 1536 facilitates the analysis and processing of hysteresis data, which is utilized to determine when to associate with the access point. A software trigger component 1538 can be provided that facilitates triggering of the hysteresis component 1538 when the Wi-Fi transceiver 1513 detects the beacon of the access point. A SIP client 1540 enables the handset 1500 to support SIP protocols and register the subscriber with the SIP registrar server. The applications 1506 can also include a client 1542 that provides at least the capability of discovery, play and store of multimedia content, for example, music.

The handset 1500, as indicated above related to the communications component 810, includes an indoor network radio transceiver 1513 (e.g., Wi-Fi transceiver). This function supports the indoor radio link, such as IEEE 802.11, for the dual-mode GSM handset 1500. The handset 1500 can accommodate at least satellite radio services through a handset that can combine wireless voice and digital radio chipsets into a single handheld device.

Figure 16:
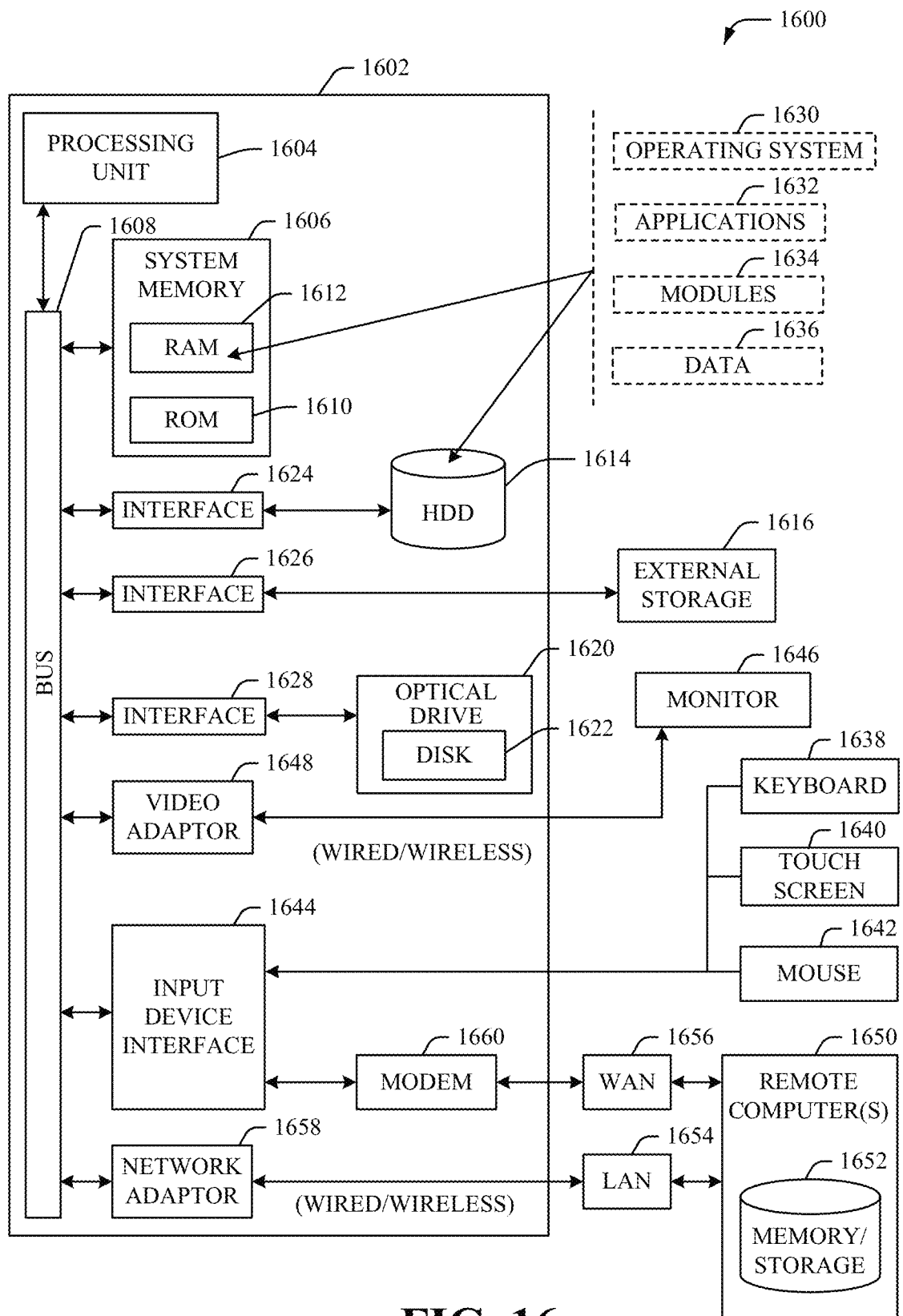
FIG. 16 illustrates an example block diagram of an example computer/machine system operable to engage in a system architecture that facilitates wireless communications according to one or more embodiments described herein.

In order to provide additional context for various embodiments described herein, FIG. 16 and the following discussion are intended to provide a brief, general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), one or more external storage devices 1616 (e.g., a magnetic floppy disk drive (FDD) 1616, a memory stick or flash drive reader, a memory card reader, etc.) and an optical disk drive 1620 (e.g., which can read or write from a CD-ROM disc, a DVD, a BD, etc.). While the internal HDD 1614 is illustrated as located within the computer 1602, the internal HDD 1614 can also be configured for external use in a suitable chassis (not shown). Additionally, while not shown in environment 1600, a solid state drive (SSD), non-volatile memory and other storage technology could be used in addition to, or in place of, an HDD 1614, and can be internal or external. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one or both of Universal Serial Bus (USB) and Institute of Electrical and Electronics Engineers (IEEE) 1594 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally include emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can include one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enabled with a security module, such as a trusted processing module (TPM). For instance with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1594 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 16 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
    a processor; and
    a memory that stores executable instructions that, when executed by the processor of the system, facilitate performance of operations, the operations comprising:
        receiving notification data describing a notification of an occurrence of an incident;
        obtaining representation data describing a visual representation of an incident zone corresponding to the incident;
        obtaining event data describing an event detected within the incident zone, wherein the event data comprises device-human interaction data describing presence of any interaction between any devices and any humans with respect to the incident, and wherein the device-human interaction data further identifies a time of an outbound text message; and
        presenting a visual playback of the incident zone, wherein the visual playback is augmented with annotation data based on the event data, wherein the presenting of the visual playback of the incident is provided in conjunction with an audio presentation that includes audio data, and wherein the audio presentation is based on a use of multiple microphones and corresponding location data of each of the multiple microphones to identify a location of a sound source included in the audio data,
        wherein the event data further comprises: device presence data describing respective presences of devices with respect to the incident, environmental sensor data describing environmental measurements made by environmental sensors with respect to an environment applicable to the incident, traffic signal data describing traffic signaling made by a traffic signal with respect to the incident, traffic light data describing traffic light signals output by traffic lights with respect to the incident, vehicle sensor data describing any vehicular measurements made by vehicle sensors with respect to vehicles in the environment applicable to the incident, wearable sensor data describing wearable device measurements made by wearable device sensors with respect to the incident, and portable sensor data describing any portable sensor measurements made by any portable sensors with respect to the incident.

2. The system of claim 1, wherein the receiving of the notification data comprises obtaining the notification data via at least one of: a device comprising a sensor, an application program, or a human-initiated report.

3. The system of claim 1, wherein the presenting of the visual playback comprises overlaying the annotation data over the visual playback as part of the visual playback, and wherein the annotation data is correlated with timestamp data, and wherein the overlaying of the annotation data over the visual playback is based at least in part on the timestamp data.

4. The system of claim 1, wherein the event data is associated with an event timeframe applicable to the event, wherein the visual playback is augmented with the annotation data by outputting an annotation describing the event based on a start of the event timeframe, and wherein the operations further comprise detecting an end of the event timeframe, and, in response to the detecting of the end of the event timeframe, discontinuing the outputting of the annotation.

5. The system of claim 1, wherein the annotation data comprises a first visible representation corresponding to a first event, which is a first part of the event, that is proximate a first location in the incident zone, and a second visible representation corresponding to a second event, which is a second part of the event, that is proximate a second location in the incident zone, and wherein the presenting of the visual playback comprises overlaying the first visible representation at the first location within a scene depicted in the visual playback, and overlaying the second visible representation at the second location within the scene depicted in the visual playback.

6. The system of claim 1, wherein the operations further comprise detecting an end of the event, and, in response to the detecting of the end of the event, discontinuing a presentation of the annotation data as part of the presenting.

7. The system of claim 1, wherein the presenting of the visual playback comprises outputting, to a virtual reality viewing device, information describing at least part of the visual playback.

8. The system of claim 1, wherein the visual playback comprises simulated video data recreating the incident during a timeframe corresponding to the incident.

9. The system of claim 1, wherein the visual playback comprises simulated video data recreating the incident from an extended reality viewing perspective of: a witness, a participant, a vehicle, and an imaginary camera position, and wherein the operations further comprise outputting instructional data to a device as part of the obtaining of the representation data describing the visual representation of the incident zone.

10. A method, comprising:
    obtaining, by a system comprising a processor, notification data representative of a notification of an incident;
    determining, by the system, a first dataset describing a zone encompassing where the incident occurred and a timeframe applicable to occurrence of the incident;
    obtaining, by the system, a second dataset representing event data describing an event that occurred in the zone during the timeframe, wherein the event data comprises device-human interaction data describing presence of any interaction between any devices and any humans with respect to the incident, and wherein the device-human interaction data further identifies a time of an outbound text message;
    determining, by the system, a third dataset comprising sensor data from a sensor that captured activity in the zone within the timeframe; and
    generating, by the system based on the first dataset, the second dataset and the third dataset, an annotated visual playback of the incident, wherein the annotated visual playback of the incident is generated in conjunction with an audio presentation that includes audio data, and wherein the audio presentation is based on a use of multiple microphones and corresponding location data of each of the multiple microphones to identify a location of a sound source included in the audio data, wherein the event data further comprises: device presence data describing respective presences of devices with respect to the incident, environmental sensor data describing environmental measurements made by environmental sensors with respect to an environment applicable to the incident, traffic signal data describing traffic signaling made by a traffic signal with respect to the incident, traffic light data describing traffic light signals output by traffic lights with respect to the incident, vehicle sensor data describing any vehicular measurements made by vehicle sensors with respect to vehicles in the environment applicable to the incident, wearable sensor data describing wearable device measurements made by wearable device sensors with respect to the incident, and portable sensor data describing any portable sensor measurements made by any portable sensors with respect to the incident.

11. The method of claim 10, wherein the generating of the annotated visual playback of the incident comprises generating a three-dimensional video simulation of a scene from a viewing perspective corresponding to a camera sensor identified in the third dataset, and annotating the three-dimensional video simulation based on the event data in the second dataset, and wherein the annotating of the three-dimensional video simulation based on the event data in the second dataset comprises determining a location in the scene corresponding to the event identified in the event data, and overlaying annotation data representing the event based on the location.

12. The method of claim 10, wherein the generating of the annotated visual playback of the incident comprises generating an augmented reality presentation from a simulated viewing perspective of at least one of: a witness, a participant, a vehicle, or an imaginary camera position, and further comprising outputting the augmented reality presentation to be rendered by an augmented reality viewing device.

13. A non-transitory machine-readable medium, comprising executable instructions that, when executed by a processor, facilitate performance of operations, the operations comprising:
receiving data describing a visual representation of a zone in which an incident occurred, the zone comprising space data and time data;
receiving event data describing an event detected within the zone, wherein the event data comprises wearable sensor data describing any wearable device measurements made by any wearable device sensors with respect to the incident, wherein the event data further comprises device-human interaction data describing presence of any interaction between any devices and any humans with respect to the incident, and wherein the device-human interaction data further identifies a time of an outbound text message; and
outputting, for presentation, a visual playback of the zone, wherein the visual playback comprises an annotation describing the event, wherein the visual playback of the zone is accompanied by an audio presentation that includes audio data, and wherein the audio presentation is based on a use of multiple microphones and corresponding location data of each of the multiple microphones to identify a location of a sound source included in the audio data, and
wherein the event data further comprises: device presence data describing respective presences of devices with respect to the incident, environmental sensor data describing environmental measurements made by environmental sensors with respect to an environment applicable to the incident, traffic signal data describing traffic signaling made by a traffic signal with respect to the incident, traffic light data describing traffic light signals output by traffic lights with respect to the incident, vehicle sensor data describing any vehicular measurements made by vehicle sensors with respect to vehicles in the environment applicable to the incident, and portable sensor data describing any portable sensor measurements made by any portable sensors with respect to the incident.

14. The non-transitory machine-readable medium of claim 13, wherein the event is associated with a location within the zone, and wherein the outputting of the visual playback of the zone comprises displaying the annotation based on the location.

15. The non-transitory machine-readable medium of claim 13, wherein the event is associated with an ending time, and wherein the outputting of the visual playback of the zone comprises discontinuing presentation of the annotation based on the ending time being reached in the visual playback.

16. The non-transitory machine-readable medium of claim 13, wherein the sound source includes a horn of a vehicle, and wherein the location of the sound source included in the audio data is further based on additional data corresponding to respective locations of the sound source detected by each of the multiple microphones.

17. The non-transitory machine-readable medium of claim 13, wherein the operations further comprise:
detecting the incident by an analysis of video of the zone, wherein the receiving of the event data is based on the detecting of the incident.

18. The non-transitory machine-readable medium of claim 17, wherein the incident is defined by an incident timeframe, and wherein the receiving of the event data includes receiving first data from fixed location sensors in the zone during the incident timeframe and receiving second data from mobile sensors that each have a transient location within the zone for at least a portion of the incident timeframe.

19. The non-transitory machine-readable medium of claim 18, wherein the detecting of the incident is based on a utilization of artificial intelligence, and wherein the receiving of the first data and the receiving of the second data are based on the fixed location sensors and the mobile sensors pushing the first data and the second data, respectively, to the processor based on the detecting of the incident.

20. The non-transitory machine-readable medium of claim 13, wherein the receiving of the event data is based at least in part on polling one or more devices determined to be proximate to the zone in a particular time period associated with the incident.

* * * * *